United States Patent
Radu

(10) Patent No.: US 11,519,782 B2
(45) Date of Patent: Dec. 6, 2022

(54) OFFSET NULLING FOR OPTICAL POWER METERS

(71) Applicant: EXFO Inc., Quebec (CA)

(72) Inventor: Nelu Radu, Quebec (CA)

(73) Assignee: EXFO Inc., Quebec (CA)

( * ) Notice: Subject to any disclaimer, the term of this patent is extended or adjusted under 35 U.S.C. 154(b) by 311 days.

(21) Appl. No.: 17/002,970

(22) Filed: Aug. 26, 2020

(65) Prior Publication Data

US 2021/0072077 A1 Mar. 11, 2021

Related U.S. Application Data

(60) Provisional application No. 62/913,303, filed on Oct. 10, 2019, provisional application No. 62/896,833, filed on Sep. 6, 2019.

(51) Int. Cl.
*G01J 1/44* (2006.01)

(52) U.S. Cl.
CPC ............ *G01J 1/44* (2013.01); *G01J 2001/444* (2013.01)

(58) Field of Classification Search
CPC ....... G01J 1/44; G01J 2001/444; G01J 1/4257
See application file for complete search history.

(56) References Cited

U.S. PATENT DOCUMENTS

| | | |
|---|---|---|
| 6,700,654 B2 | 3/2004 | Gerrish et al. |
| 8,520,199 B2 | 8/2013 | Murayama et al. |
| 9,541,449 B2 | 1/2017 | Wagner et al. |
| 2004/0253003 A1* | 12/2004 | Farmer ............... H04J 14/0232 348/E7.07 |
| 2005/0105170 A1* | 5/2005 | Shukunami ......... H01S 3/06754 359/341.41 |

FOREIGN PATENT DOCUMENTS

EP 1596510 A1 11/2005

OTHER PUBLICATIONS

Wikipedia, Saturation current [online], Feb. 27, 2018, Retrieved from the Internet:<URL: https://en.wikipedia.org/w/index.php?title=Saturation_current&oldid=827946523>.
Hamamatsu, InGaAs PIN photodiodes—G11193 series, Nov. 2017, Cat. No. KIRD1111E04.
Hamamatsu, InGaAs PIN photodiodes—G10899 series, Dec. 2017, Cat. No. KIRD1106E04.
Wikipedia, Shockley diode equation [online], Sep. 21, 2018, Retrieved from the Internet:<URL: https://en.wikipedia.org/w/index.php?title=Shockley_diode_equation&oldid=860573457>.

(Continued)

*Primary Examiner* — Thanh Luu
*Assistant Examiner* — Monica T Taba
(74) *Attorney, Agent, or Firm* — Helene Chotard

(57) ABSTRACT

There is provided an optical power measurement method, an offset calibration method and an optical power meter that is adapted to apply the offset calibration method. The optical power measurement method, the offset calibration method and the optical power meter are characterized in that two temperature sensors are used for more accurate predictions of the optical power offset. A first temperature sensor is positioned to read a temperature of the photodiode and a second temperature sensor is positioned to read a temperature of the PCB ground plane.

16 Claims, 8 Drawing Sheets

(56) References Cited

OTHER PUBLICATIONS

Teledyne Judson Technologies, J16 Series Germanium Photodiodes Operating Instructions, Oct. 2000, PB 1600.
Teledyne Judson Technologies, J22 and J23 Series InGaAs Photodiodes Operating Instructions, Sep. 2003, PB 4206.
Texas Instruments, OPAx388 Precision, Zero-Drift, Zero-Crossover, True Rail-to-Rail Input/Output, Dperational Amplifiers, Dec. 2016, SBOS777.
Hamamatsu, Photodiode Technical Information, unknown publication date [available at least as of Jun. 5, 2019].
California Polytechnic State University—Solid State Physics Laboratory, Experiment 15: Temperature Dependence of the Saturation Current of a Junction Diode, unknown publication date [available at least as of Jun. 5, 2019].
Wikipedia, Seebeck coefficient [online], May 5, 2019, Retrieved from the Internet:<URL: https://en.wikipedia.org/w/index.php?title=Seebeck_coefficient&oldid=895634075>.

* cited by examiner $$Io = IL - ID - I' = IL - Is\,(exp\,\frac{eVD}{kT} - 1) - I'$$

OFFSET NULLING FOR OPTICAL POWER METERS

TECHNICAL FIELD

The present description generally relates to optical power meters, and more particularly to offset nulling.

BACKGROUND

Optical power of light is typically measured using a photodiode which converts optical power received on the surface of the photodiode into photocurrent.

Even in absence of light incident on the photodetector, photodiodes generally generate an electrical noise, called the "dark current". The total current out of the photodiode is therefore the sum of photocurrent and the dark current. If not accounted for, the dark current introduces an offset in the optical power measurement, which impacts the linearity or implicit uncertainty of the measurement. It is known that the dark current significantly varies with the temperature of the photodiode.

When measuring optical power using a photodiode, it is known in the art to perform a prior step of offset nulling to cancel the optical power offset caused by dark current and other electrical circuit components. Because of the temperature variation of the offset, such offset nulling is valid only for the moment of the offset nulling is executed and, it is typically recommended to repeat the offset nulling step each time the optical power meter is being used. Such offset nulling is also sensitive to optical power meter warm-up and care should be taken to perform the offset nulling step after the recommended warm-up time. Offset nulling can be automated by blocking input light or switching the input electronic circuit. Some drawbacks of such offset nulling (manual or automated) is that the measurement process needs to be interrupted to perform this operation, which must be performed with great care and requires some additional time and additional hardware.

One alternative solution is to perform a factory offset nulling calibration at a given room temperature (23° C.±1° C.) after a given warm-up time. This factory offset nulling calibration allows to avoid the repetition of the offset nulling step in the field for each new optical power measurement, as long as the optical power meter is used near the given room temperature. Any measurement made outside of a narrow temperature range is subject to an offset nulling error.

However, handheld optical power meters are intended for outdoor use, under high humidity and temperature ranges. When handheld optical power meters are made hermetically closed, they may require hours as warm-up time. A factory offset nulling calibration cannot be made reliable without such warm-up time and such warm-up time is not acceptable in the industry.

There therefore remains a need for an offset nulling calibration method that allows for optical power measurements at varying ambient temperatures, without requiring long warm-up time.

SUMMARY

There is provided an optical power measurement method, an offset calibration method and an optical power meter that is adapted to apply the offset calibration method. The optical power measurement method, the offset calibration method and the optical power meter are characterized in that two temperature sensors are used for more accurate predictions of the optical power offset. A first temperature sensor is positioned to read a temperature of the photodiode and a second temperature sensor is positioned to read a temperature of the PCB ground plane.

From optical power offset values obtained for two different temperature points, a numerical model can be derived, which accounts for the thermal law of the photodiode, the transimpedance amplifier and the overall electrical amplification circuit. This numerical model may then later be applied to predict the optical power offset for subsequent optical power measurements obtained with different photodetector and ground plane temperature values, based on the derived numerical model.

Using the proposed numerical model, the optical power meter may be calibrated by measuring the optical power offset measurement at only two different temperature points. In one embodiment, these measurements can be read during the warm-up procedure either at factory calibration or on-site self-calibration. Advantageously, the offset calibration step does not require any specific nor steady temperature set points.

Advantageously, once the offset calibration process is completed, the optical power meter can be used with close to zero warm-up time compared to prior art methods. In some implementations, the proposed calibration method may not require any additional step, on top of those already required for wavelength calibration for example, thereby reducing calibration time.

In accordance with one aspect, there is provided an optical power measurement method comprising:
at a measurement temperature point,
  reading a raw optical power value from an optical power meter comprising a photodetector and an amplification circuit;
  reading a measurement photodetector temperature value ($T_{pd}$) associated with the photodetector; and
  reading a measurement ground plane temperature value ($T_{gnd}$) associated with a ground plane of the amplification circuit;
determining a measurement optical power offset value from predetermined parameters associated with the photodetector and the amplification circuit of the optical power meter, said measurement photodetector temperature value ($T_{pd}$) and said measurement ground plane temperature value ($T_{gnd}$).
deriving an optical power measurement value from said raw optical power value and the determined measurement optical power offset value.

The predetermined parameters may be obtained from prior steps of:
at a first temperature point:
  reading a first photodetector temperature value ($T_{pd0}$) associated with the photodetector of the optical power meter; and
  reading a first ground plane temperature value ($T_{gnd0}$) associated with the ground plane of the amplification circuit of the optical power meter;
  for a first amplification gain setting and for a second amplification gain setting: reading optical power offset values (A0, B0);
at a second temperature point different from the first temperature point:
  reading a second photodetector temperature value ($T_{pd1}$) associated with the photodetector of the optical power meter; and reading a second ground plane temperature value ($T_{gnd1}$) associated with the ground plane of the amplification circuit of the optical power meter;

for said first amplification gain setting and for said second amplification gain setting:

reading optical power offset values (A1, B1);

deriving said predetermined parameters associated with the photodetector and the amplification circuit of the optical power meter, from the read optical power offset values (A0, B0; A1, B1), photodetector temperature values ($T_{pd0}$, $T_{pd1}$) and ground plane temperature values ($T_{gnd0}$, $T_{gnd1}$).

In accordance with another aspect, there is provided an offset calibration method comprising:

at a first temperature point:

reading a first photodetector temperature value ($T_{pd0}$) associated with a photodetector of the optical power meter; and reading a first ground plane temperature value ($T_{gnd0}$) associated with a ground plane of the amplification circuit of the optical power meter;

for a first amplification gain setting and for a second amplification gain setting:

reading optical power offset values (A0, B0);

at a second temperature point different from the first temperature point:

reading a second photodetector temperature value ($T_{pd1}$) associated with a photodetector of the optical power meter; and reading a second ground plane temperature value ($T_{gnd1}$) associated with a ground plane of the amplification circuit of the optical power meter;

for said first amplification gain setting and for said second amplification gain setting:

reading optical power offset values (A1, B1);

deriving parameters associated with the photodetector and the amplification circuit of the optical power meter, from the read photodetector temperature values ($T_{pd0}$, $T_{pd1}$), ground plane temperature values ($T_{gnd0}$, $T_{gnd1}$) and optical power offset values (A0, B0; A1, B1).

In accordance with yet another aspect, there is provided an optical power meter comprising:

a photodetector, an amplification circuit and an analog-to-digital converter for reading a raw optical power value;

a first temperature sensor associated with the photodetector for measuring a photodetector temperature value ($T_{pd}$);

a second temperature sensor associated with a ground plane of the amplification circuit for measuring a ground plane temperature value ($T_{gnd}$); and a processing unit configured for:

determining a measurement optical power offset value from predetermined parameters associated with the photodetector and the amplification circuit, the photodetector temperature value ($T_{pd}$) and the ground plane temperature value ($T_{gnd}$); and deriving an optical power measurement value from said raw optical power value and the determined measurement optical power offset value.

It is noted that the measurement temperature point can be different from both the first temperature point and the second temperature point.

Moreover, the raw optical power value can be read using the first amplification gain setting, the second amplification gain setting or a third amplification gain setting that is different from both the first temperature point and the second temperature point.

In this specification, unless otherwise mentioned, word modifiers such as "substantially" and "about" which modify a value, condition, relationship or characteristic of a feature or features of an embodiment, should be understood to mean that the value, condition, relationship or characteristic is defined to within tolerances that are acceptable for proper operation of this embodiment in the context its intended application.

In the present description, the terms "light" and "optical" are used to refer to radiation in any appropriate region of the electromagnetic spectrum. More particularly, the terms "light" and "optical" are not limited to visible light, but can include, for example, the infrared wavelength range. For example, in some embodiments, the wavelength of the light signal measured by the optical power meter can lie in a range from about 800 nm to about 1650 nm.

Further features and advantages of the present invention will become apparent to those of ordinary skill in the art upon reading of the following description, taken in conjunction with the appended drawings.

Figure 1:
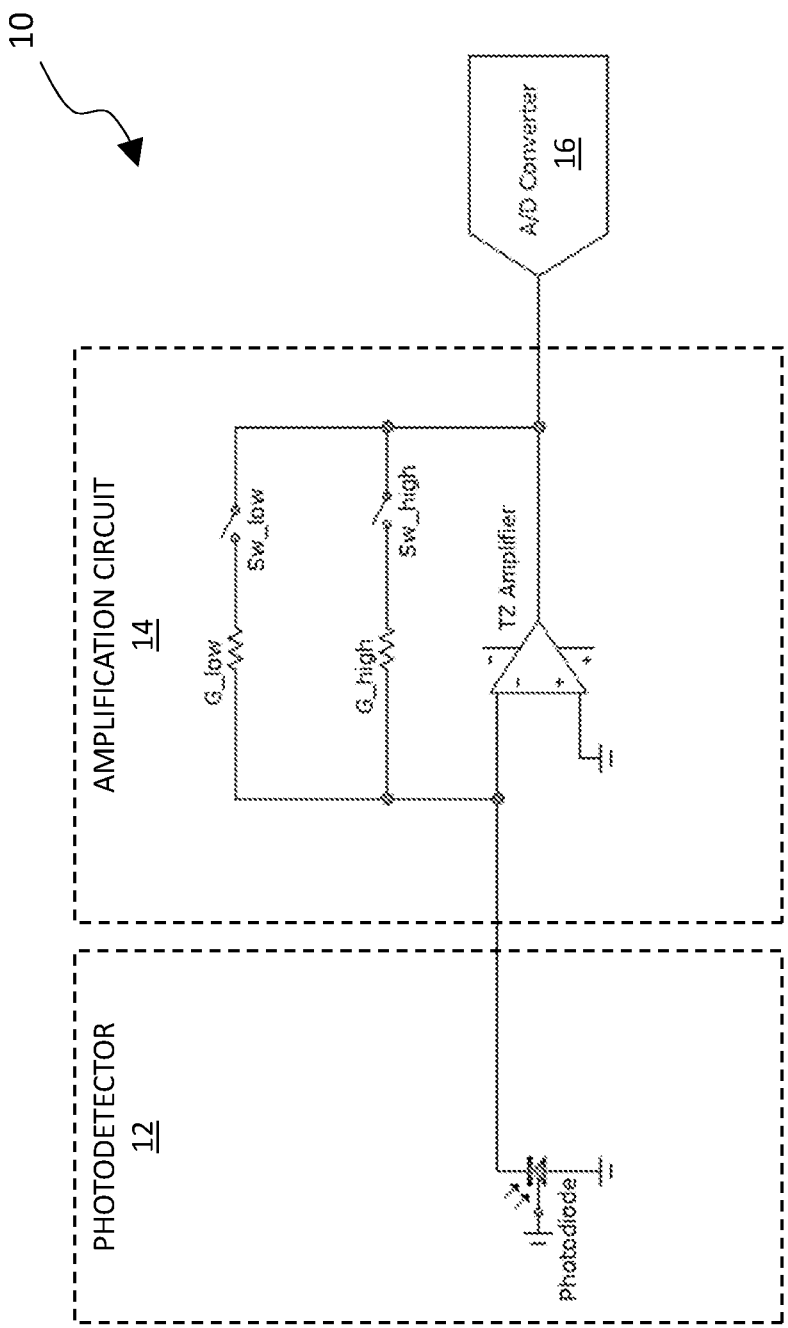
FIG. 1 (prior art) is a schematic illustrating an electrical circuit of an optical power meter, in accordance with a prior art embodiment.

It will be noted that throughout the drawings, like features are identified by like reference numerals. To not unduly encumber the figures, some elements may not be indicated in some figures if they were already identified in a preceding figure. It should be understood herein that elements of the drawings are not necessarily depicted to scale. Some mechanical or other physical components may also be omitted in order to not encumber the figures.

The following description is provided to gain a comprehensive understanding of the methods, apparatus and/or systems described herein. Various changes, modifications, and equivalents of the methods, apparatuses and/or systems described herein will suggest themselves to those of ordinary skill in the art. Description of well-known functions and structures may also be omitted to enhance clarity and conciseness.

Although some features may be described with respect to individual exemplary embodiments, aspects need not be limited thereto such that features from one or more exemplary embodiments may be combinable with other features from one or more exemplary embodiments.

DETAILED DESCRIPTION

FIG. 1 shows a conventional electrical circuit for an optical power meter 10. The optical power meter 10 comprises a photodetector 12 implemented as a photodiode such as a PIN photodiode or any other type of p-n junction photodiode, without limitation to the semiconductor material, an amplification circuit 14 and an analog-to-digital (A/D) converter 16. In an ideal case, a digital count at the output of the analog-to-digital converter 16 is linearly related to optical power incident on the photodetector 12. The amplification circuit 12 comprises a transimpedance amplifier TZ amplifier having a number of selectable linear amplification gain settings G_low and G_high, also referred to herein as scale numbers i, implemented via amplification gain setting resistors that are selectable in software or firmware via switches Sw_low and Sw_high. Of course, the number of amplification gain settings may vary.

When measuring optical power using the optical power meter 10, it is known in the art to perform a prior step of offset nulling to cancel the optical power offset caused by dark current and other electrical circuit components. This is performed by reading the output of the A/D converter 16 while a nulling cap is placed on the photodetector (in order to block any incident light). The process can be repeated for each scale number i. The values obtained by this process can be referred to as the offset values $offset_i$.

The optical power measurement $net_i$ is then obtained by subtracting the offset value $offset_i$ from the raw optical power value raw later read by the optical power meter 10:

$$net_i = raw - offset_i \quad (1)$$

wherein i is the scale number being employed for the measurement, $net_i$ is optical power measurement value obtained with scale i, raw is the actual value read on the A/D converter 16 for a given optical power and $offset_i$ is the offset value for scale i.

Because of the temperature dependence of the optical power offset, such offset nulling is valid only for the moment of the offset nulling and, it is typically recommended to repeat the offset nulling step each time the optical power meter is being used. Such offset nulling is also sensitive to optical power meter warm-up and care should be taken to perform the offset nulling step after the recommended warm-up time.

Of course, the unit used to represent optical power offset values $offset_i$, raw optical power values raw and optical power measurement values net may vary. For example, these values may be expressed in measurement units that are representative of a physical quantity such as watts (including milliwatts, microwatts, etc.) or decibel-milliwatts (dBm), or in reading counts as directly read at the output of the A/D converter (to be converted thereafter in a measurement unit).

Figure 2:
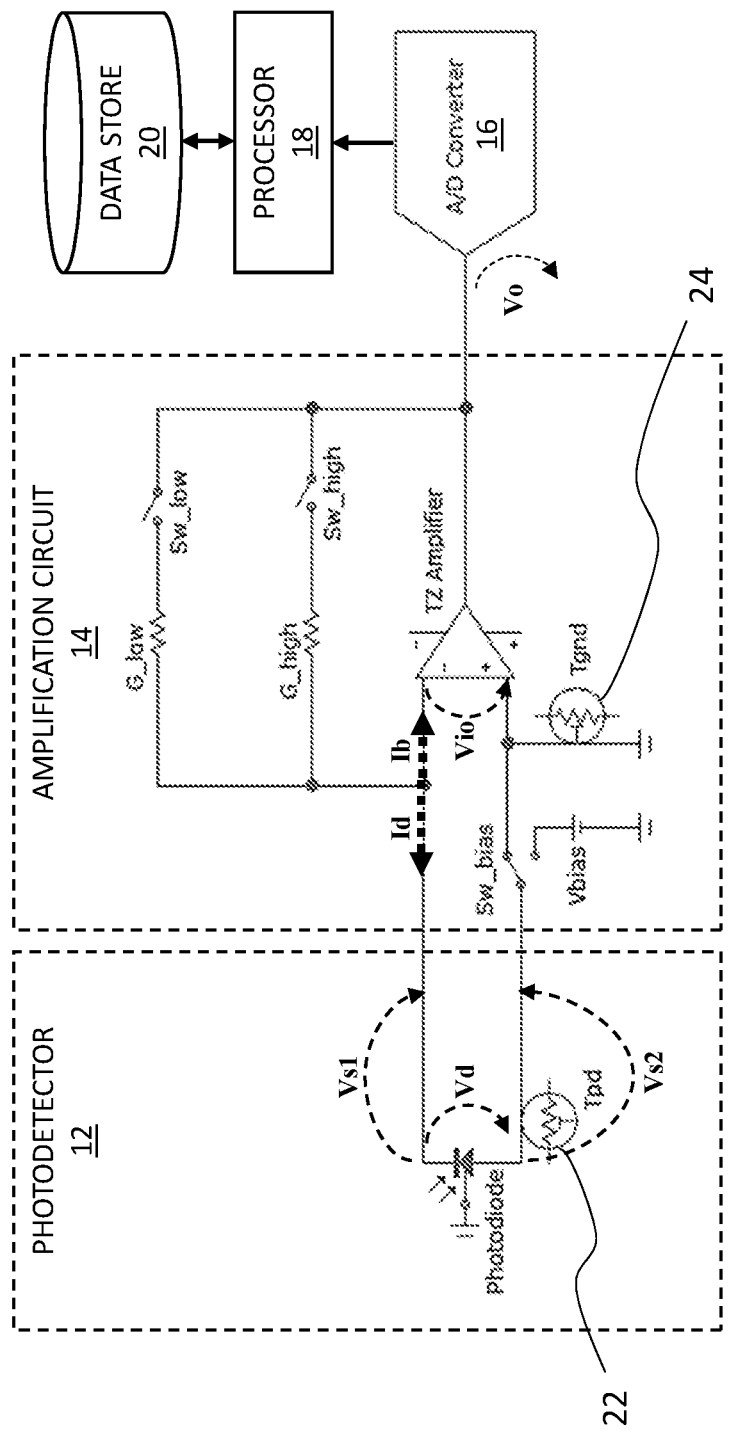
FIG. 2 a schematic illustrating an optical power meter, in accordance with one embodiment.
Figure 3:
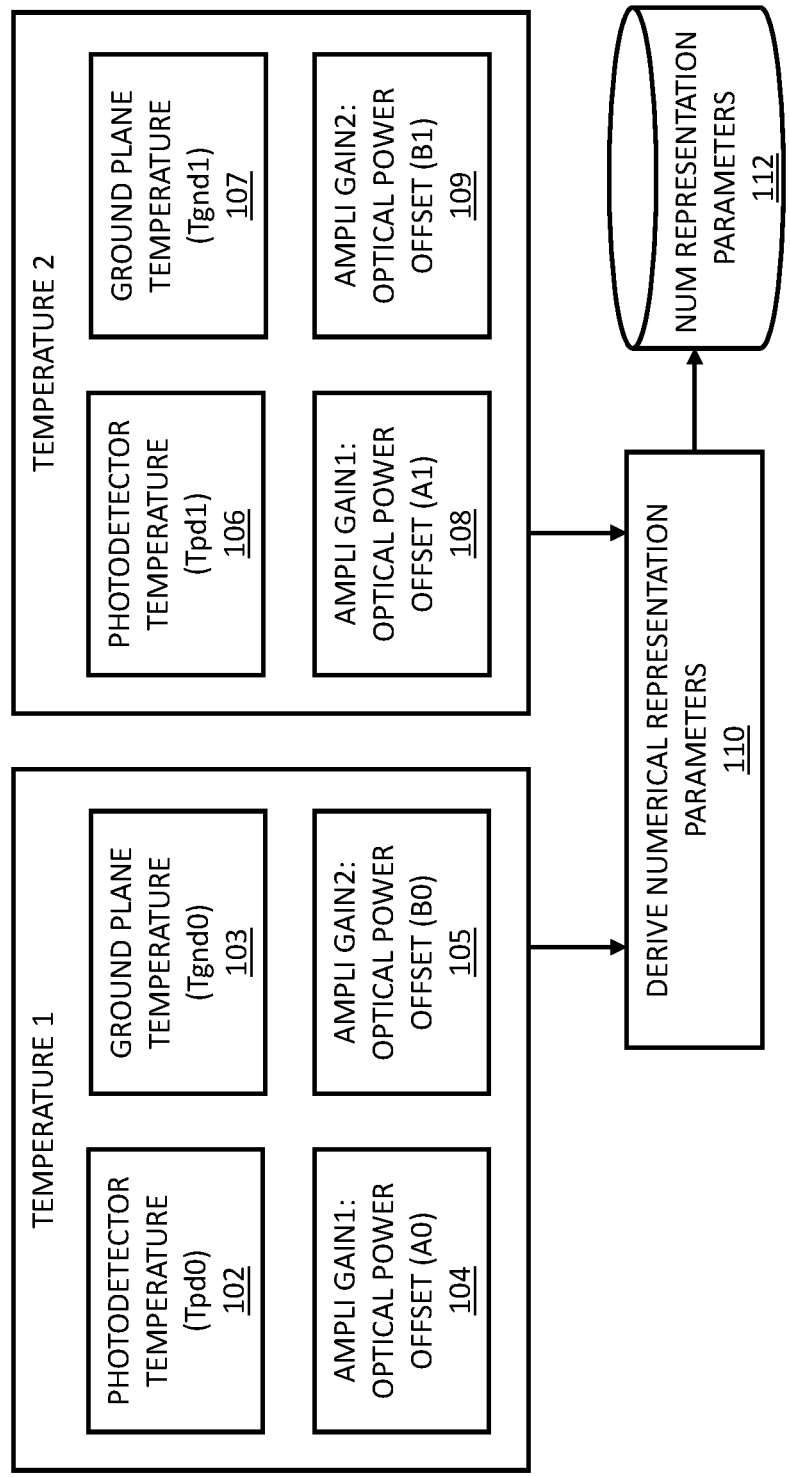
FIG. 3 is a flow chart illustrating a calibration method for characterizing an optical power offset of an optical power meter, in accordance with one embodiment.

Now referring to FIGS. 2 and 3, there are herein provided an optical power meter and a calibration method that allow to predict the optical power offset as would be read by the optical power meter at temperature points other than those used for calibration.

FIG. 2 shows an optical power meter 11 comprising a photodetector 12 implemented as a photodiode such as a PIN photodiode or any other type of p-n junction photodiode (including, without limitation, planar diffusion, low-capacitance planar diffusion, Schottky and avalanche photodiodes), without limitation to the semiconductor material (including, without limitation, Si, Ge, InGaAs, etc.), an amplification circuit 14, an A/D converter 16, a processor 18 and a data store 20. The optical power meter 11 includes features similar to those of optical power meter 10 and like features will not be repeatedly described. In addition to the selectable linear amplification gain settings G_low and G_high, also referred to herein as scale numbers i, the amplification circuit may optionally comprise a bias setting Vbias also controllable in software or firmware via actuator Sw_bias, to apply a reverse bias voltage Vbias to the photodetector 12. As known in the art, reverse bias voltage may be used to improve high signal linearity.

In the optical power meter 11, a first temperature sensor 22 and a second temperature sensor 24 are respectively positioned to measure the actual temperature of the photodetector Tpd and the actual temperature of the PCB ground plane Tgnd for more accurate predictions of the optical power offset. It is noted that the temperature of the PCB ground plane Tgnd indicates the actual temperature of the amplification circuit, including the transimpedance amplifier and amplification gain setting resistors.

A calibration procedure is applied to the optical power meter 11 in order to derive a numerical representation of the optical power offset as a function of the actual photodetector temperature Tpd and ground plane temperature Tgnd as read from the temperature sensors 22, 24. Advantageously, the calibration procedure can be performed once at factory and its result be later used to predict the optical power offset as a function of temperature values (Tpd, Tgnd) read at the temperature sensors. Of course, it can also be repeated at any other time in the lifetime of the optical power meter 11. It may also be cyclically repeated at predetermined time intervals or repeated at requested recalibration to account for aging.

The calibration procedure does not exclude the use of prior-art offset nulling and his legacy application (compliance certificate, etc.) which can replace the herein-proposed calibration method at any time.

It should however be understood that the thermal variation of the optical power offset is specific to each photodetector and therefore to each individual optical power meter 11, which is thus individually calibrated.

Using the proposed numerical model, the proposed calibration procedure measures the actual optical power offset values at two different temperature points. For example, these measurements can be read during a warm-up procedure wherein the temperature of the optical power meter 11 typically varies from the room temperature to a higher steady-state operating temperature. Advantageously, such a procedure does not require any extra or controlled temperature set points. Of course, additional and/or stable temperature points may alternatively be used as it fits to the practical implementation.

The calibration procedure is then used to derive parameters associated with the photodetector and the amplification circuit of the optical power meter, including their thermal law, in accordance with a numerical representation thereof.

In one embodiment, the numerical representation of the optical power offset $offset_i$ is as follows:

$$net_i = raw - Kel_i * (Ib(Tgnd) + Id(Tpd)) - Vo(Tgnd) \quad (2)$$

wherein i is the scale number being employed for the measurement, $net_i$ is optical power measurement value obtained with scale i, raw is the actual value read on the A/D converter 16 for a given optical power, Tgnd is the actual temperature of the PCB ground plane as can be read on temperature sensor 24, Tpd is actual temperature of the photodetector as can be read on temperature sensor 22, $Kel_i$ is the amplification gain for scale i (in count/A), Ib is the transimpedance amplifier input bias as a function of temperature $T_{gnd}$, Id is the photodetector dark current as a function of temperature Tpd, Vo is the amplification circuit offset as a function of temperature Tgnd.

The photodetector dark current can be expressed as:

$$Id(Tpd) = Id0 * 10^{m*Tpd} \quad (3a)$$

wherein Id0 is the photodetector dark current at Tpd=0° C. and m is the photodetector dark current exponent slope and thermal law.

Or equivalently, using an exponential e base function:

$$Id(Tpd) = Id0 * e^{m*Tpd*\ln(10)} \quad (3b)$$

Or more generally:

$$Id(Tpd) = Id0 * 10^{m*(Tpd-T0)} \quad (3c)$$

where T0 is the reference temperature corresponding to Id0.

As will be described hereinbelow, the general behavior of the optical power offset as represented in the numerical representation can be based on the photodetector and the transimpedance amplifier datasheet information, whereas specific parameters (such as Ib0, Id0 and Vo) of the individual optical power meter can be derived from the calibration procedure.

As to values of amplification gain $Kel_i$ for each possible scale i, these values may be obtained, e.g., from design parameters of the amplification circuit or by prior electrical calibration of the amplification circuit.

It is noted that the optical power meter 11 of FIG. 2 has two amplification gain settings which are both used in the calibration method. Of course, optical power meters may use more than two amplification gain settings. In this case, any two of the amplification gain settings may be used in the calibration method but it was found that using the highest gain and lowest gain may provide more reliable results.

The processor 18 may implement processing steps of the optical power measurement method, such as determining the optical power offset value from predetermined parameters as saved in the data store 20 and derive optical power measurement values from raw optical power values read by the A/D converter 16.

Furthermore, in some embodiments, the calibration method may be implemented via a software that is embedded in the optical power meter 11 and executed by the processor 18. In this case, the processor may further implement the processing steps of the calibration method. In other embodiments which can be suitable, e.g. for factory calibration, the calibration method may be implemented via an external computing device, such as a personal computer, a laptop, a tablet, a smartphone, etc., that is temporarily connected to the optical power meter 11 during the calibration process. In any case, parameters derived from the calibration method are stored in data store 20 for later user in the optical power measurement method.

The data store 20 may further hold computer instructions, in the form, e.g., of software or firmware, for execution by the processor 18 to perform the processing steps of the optical power measurement method and, optionally, the processing steps of the calibration method. As such, the data store 20 may comprise, e.g. an EPROM, an EEPROM, a flash memory or any other technology of non-volatile memory, either read-write or read-only.

Calibration Method:

FIG. 3 shows a calibration method for characterizing an optical power offset of an optical power meter, in accordance with one embodiment. For better ease of understanding, the calibration method is herein described in reference to the optical power meter 11 of FIG. 2.

Offset measurements are conducted at a first temperature point via steps 102, 103, 104, and 105 and repeated at a second temperature point via steps 106, 107, 108 and 109.

Optical power offset values are read by recording the actual value raw when no light is incident on the photodetector. Light can be blocked from the photodetector, e.g., by placing a nulling cap the photodetector receptacle (as known in the art).

At the first temperature point, a first photodetector temperature value Tpd0 is read using temperature sensor 22 associated with the photodetector 12 (step 102) and a first ground plane temperature value Tgnd0 is read using temperature sensor 24 associated with a ground plane of the amplification circuit of the ground plane of the amplification circuit 14 (step 103). Still at the first temperature point, an optical power offset value A0 is read for a first amplification gain setting (e.g. G_high) (step 104) and an optical power offset value B0 is read for a second amplification gain setting (e.g. G_low) (step 105).

Then, at the second temperature point, a second photodetector temperature value Tpd1 is read using temperature sensor 22 associated with the photodetector 12 (step 106) and a second ground plane temperature value Tgnd1 is read using temperature sensor 24 associated with a ground plane of the amplification circuit of the ground plane of the amplification circuit 14 (step 107). Still at the second temperature point, an optical power offset value A1 is read for a first amplification gain setting (e.g. G_high) (step 108) and an optical power offset value B1 is read for a second amplification gain setting (e.g. G_low) (step 109).

It is noted that the order in which those measurements are read is immaterial as long as the measurements of steps 102, 103, 104, 105 are read at one same temperature point and the measurements of steps 106, 107, 108, 109 are read at another same temperature point.

In one embodiment, the first and second temperature points can be obtained during a warm-up procedure wherein the temperature of the optical power meter 11 typically varies from the room temperature to a higher steady-state operating temperature. For example, the first temperature point can be obtained at the time the optical power meter 11 is switched on (when the internal temperature of the optical power meter is the ambient temperature) or after some small time period has lapsed, and the second temperature point be obtained after some longer time has lapsed (and the internal temperature has reached a different level). For example, the second temperature point may be obtained after a given warmup time, such as, e.g. 15 minutes, 30 minutes or even a few hours after the unit is switched on.

This procedure is not very sensitive to ambient temperature or ambient temperature stability but may still be more accurate if the ambient temperature is about 23° C. or greater, with a variation below ±1° C. For better results, a minimum temperature difference (such as more than 2° C.) may be set between the first temperature point and the second temperature point (e.g. |Tpd1−Tpd0|>2° C. or |Tgnd1−Tgnd0|>2° C.).

Then, in step 110, from the optical power offset values, photodetector temperature values and ground plane temperature values read in steps 102, 103, 104, 105, 106, 107, 108, 109, parameters are derived, which parameters are associated with the photodetector 12 and the amplification circuit 14 of the optical power meter 11, for later use in the numerical representation of the optical power offset as a function of the photodetector temperature Tpd and the ground plane temperature Tgnd.

In one embodiment, the derived parameters comprise the input bias current Ib of the amplifier, the dark current Id0 of the photodetector at a reference temperature and the amplification circuit offset as a function of temperature Vo(Tgnd).

Implementation details for deriving the numerical representation parameters are described hereinbelow.

In step 112, the thereby derived parameters may then be saved for later use, e.g., in data store 20.

The calculation method may be implemented in an optical power meter software or firmware executed by a processor 18 embedded in the optical power meter 11 or a software executed by an external computer, such as a personnel computer or a laptop. In addition to deriving the parameters, the software or firmware may control the execution of steps 102 to 109 by triggering the reading of optical power offset values and temperature values.

Figure 4:
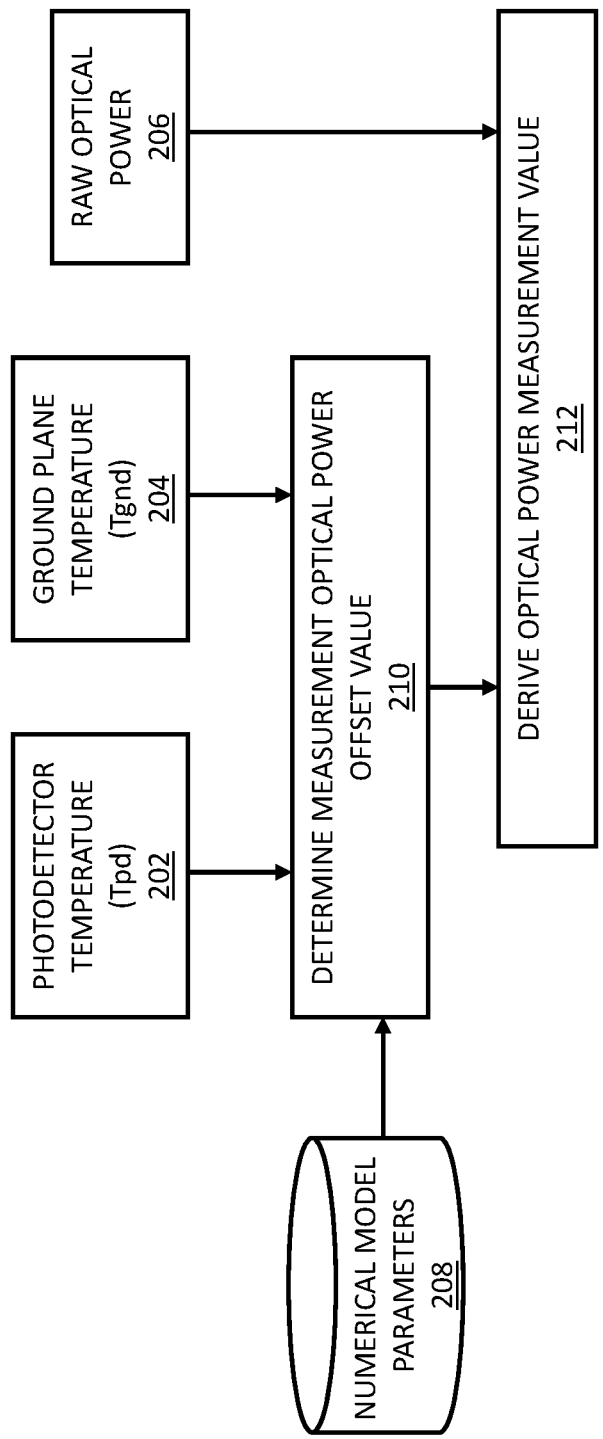
FIG. 4 is a flow chart illustrating an optical power measurement method, in accordance with one embodiment.

Optical Power Measurement Method:

FIG. 4 shows an optical power measurement method in accordance with one embodiment and from which optical power measurement values can be derived while accounting for the optical power offset of the optical power meter using the numerical representation derived from the calibration method described hereinabove. For better ease of understanding, the optical power measurement method is herein described in reference to the optical power meter 11 of FIG. 2.

An optical power measurement is now performed at a measurement temperature point that can differ from both the first temperature point and the second temperature point. Nonetheless, the optical power offset $offset_i$ as would be read in absence of incident light on the photodetector can be retrieved using the numerical representation and its parameters as derived from the calibration method of FIG. 3, without actually performing an offset measurement at this temperature.

Therefore, at the measurement temperature point, a photodetector temperature value Tpd is read using temperature sensor 22 associated with the photodetector 12 (step 202) and a ground plane temperature value Tgnd is read using temperature sensor 24 associated with a ground plane of the amplification circuit 14 (step 204). Still at the measurement temperature point, a raw optical power value raw is read for a given amplification gain setting (e.g. G_high, G_low or any other) (step 206).

Then, the optical power offset value offset is determined (step 210) from predetermined parameters (Ib, Id0, Vo(Tgnd)) (208), the read photodetector temperature value Tpd and the read ground plane temperature value Tgnd using, e.g. Equation 2 combined with Equation 3a, 3b or 3c or any equivalent thereof, and an optical power measurement value $net_i$ is derived from the a raw optical power value raw and the determined optical power offset value $offset_i$:

$$net_i = raw - Kel_i*(Ib(Tgnd) + Id0*10^{m*Tpd}) - Vo(Tgnd) \quad (2a)$$

Numerical Representation:

As can be noticed from Equation 2, the proposed numerical representation for the optical power offset $offset_i$ accounts for two distinct sources of offset: the first term accounts for the sum of input currents, as amplified by selected scale gain Kel; and the second term accounts for other contributions to the offset from components of the amplification circuit (Vo).

The amplification circuit offset Vo accounts for electrical circuit offset, including amplifier output offset, resistors dividers offset, reference offset and A/D converter offset. The thermal law of the amplification circuit offset Vo can be assumed linear as a function of temperature. The amplification circuit offset Vo is not scale dependent. Vo value and its thermal law can be determined by the calibration procedure.

$Kel_i$ is a constant representing the amplification gain for scale i (in count/A), which represents the transfer function of the amplification circuit.

Ib is input bias current of the transimpedance amplifier. The thermal law of the input bias current Ib can also be assumed linear as a function of temperature. Ib value and its thermal law can be determined by the calibration procedure.

Id is the photodetector dark current which can be represented by an exponential function of the temperature, which can be determined by the calibration procedure.

The electrical current I as amplified by the transimpedance amplifier and which results in optical power offset in absence of incident light is defined as:

$$I = Ib + \frac{Vio}{Rsh} \quad (4)$$

wherein Vio is the input offset voltage of the transimpedance amplifier and Rsh is photodiode shunt resistance.

As per photodiode manufacturers and optical industry definitions:

$$Id = \frac{10 \text{ (mV)}}{Rsh} \quad (5)$$

For precision amplifiers, Vio is very small (less than μV) and very stable with temperature (nV/° C.) and that second term of Equation 4 becomes Id directly proportional.

Figures 5, 6:
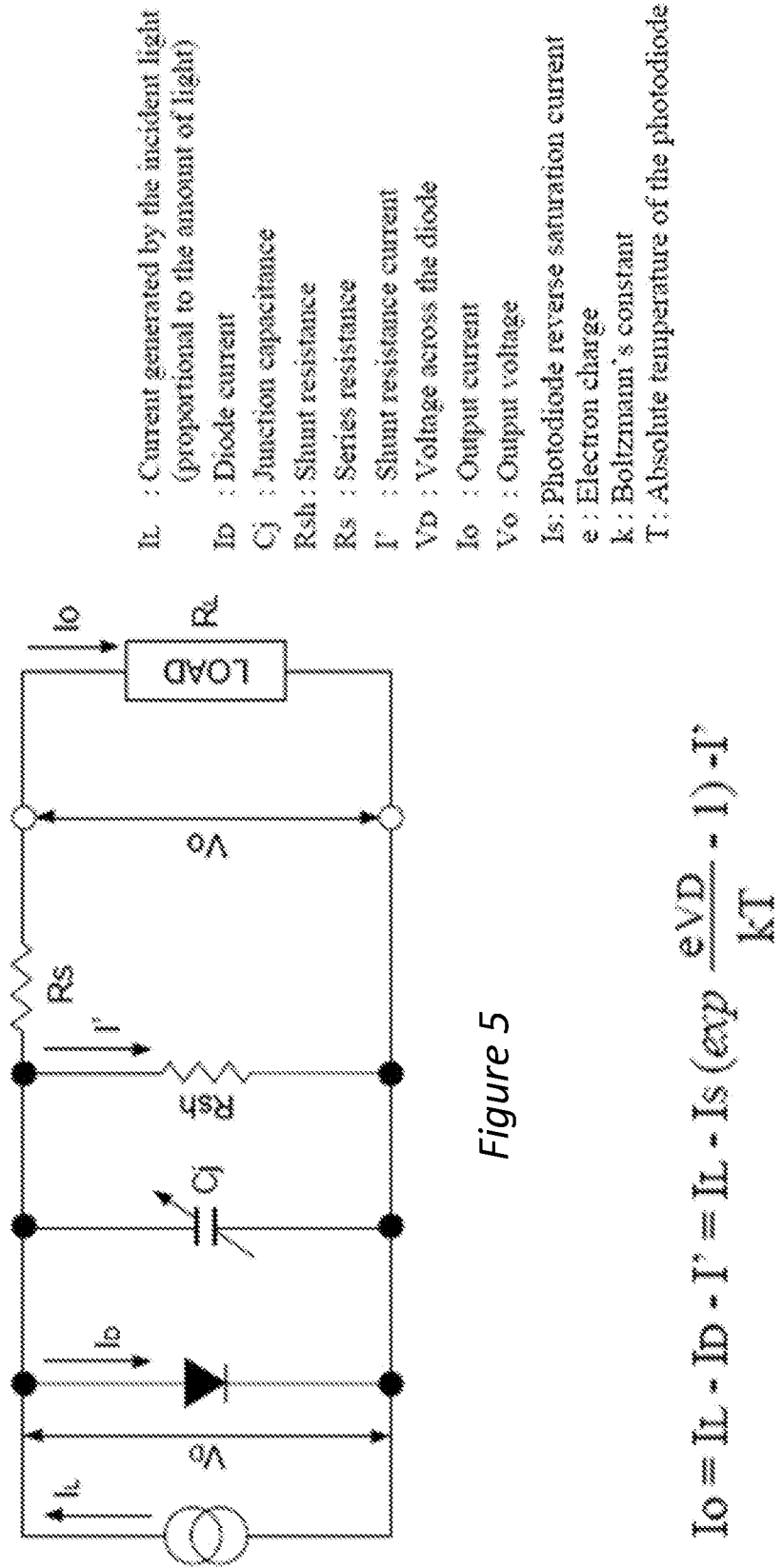
FIG. 5 is a schematic illustrating a photodiode equivalent circuit model as known in the art.
FIG. 6 is an equation corresponding to the photodiode equivalent circuit of FIG. 5.

FIG. 5 shows a photodiode equivalent circuit model as known in the art (see Hamamatsu datasheets). According to this model and the fundamental Shockley diode equation (Equation 6), the output current Io of the photodetector can be found as per the equation of FIG. 6 and the diode current $I_D$ is represented as follows:

$$Id = Is\left(\exp^{\frac{eVd}{\eta kT}} - 1\right) \quad (6)$$

where:
Id is the diode current,
Is is the photodiode reverse bias saturation current (or scale current),
Vd is the voltage across the diode,
e is the electron charge,
k is Boltzmann constant,
T is the absolute temperature of the photodiode,
η is the ideality factor, also known as the quality factor or sometimes emission coefficient.

It is noted that the Shockley equation applies to any type of p-n junction photodiode. It will be understood that, if the method described herein is applied to other types of photodetectors, including PIN photodiodes, the example numerical model described herein to represent the behavior the photodiode can be modified and/or adapted to account for the difference in behavior of such other type of photodetector.

Note that the saturation current Is is not a constant and varies with temperature. This variation is the dominant term in the temperature coefficient of the photodiode.

The thermal law of Is is exposed in California Polytechnic State University—Solid State Physics Laboratory, Experiment 15: Temperature Dependence of the Saturation Current of a Junction Diode:

$$Is = I_{diff} + I_{gen} = [\text{constants}]n_i^2(T) + [\text{other constams}]n_i(T) = \quad (8)$$

$$A\left(\exp\frac{-Eg}{kT}\right) + B\left(\exp\frac{-Eg}{2kT}\right)$$

wherein:
Idiff is the diffusion current,
Igen is the generated current,
$n_i$ is the intrinsic carrier concentration in the semiconductor material,
Eg is the gap energy between the valence and conduction bands,
k is Boltzmann's constant,
T is the absolute temperature of diode junction.
Equivalently:

$$Is = [\text{constants}]\exp\frac{-Eg}{\chi kT} \quad (9)$$

If the diffusion current dominates the saturation current, then x=1. If the generation current dominates, then x=2. Equivalently again, by applying a logarithm:

$$\ln(Is) = [\text{constants}] - \frac{Eg}{\chi kT} \quad (10)$$

Figure 7:
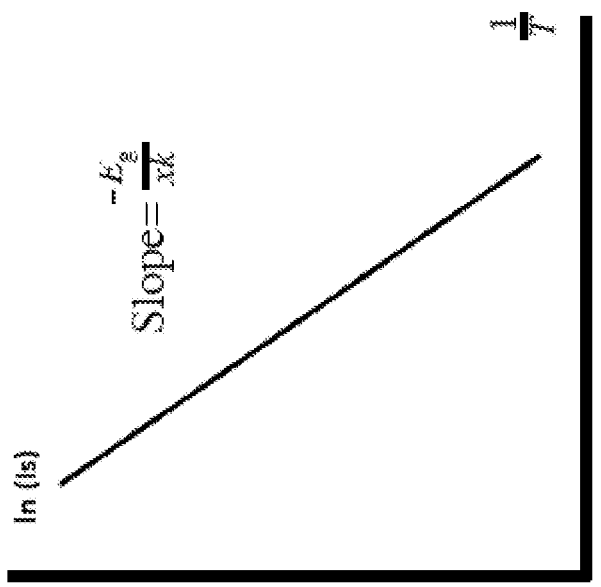
FIG. 7 is a graph showing a graphical representation of the thermal law governing the photodiode reverse saturation current.

FIG. 7 shows a graphical representation of Equation 10.
From results of this experiment by the California Polytechnic State University, it can be shown that the thermal law governing Id is as follows:

$$Id = \exp^{mT + constant} = Id0 * \exp^{m*Tpd} \quad (11)$$

wherein:
Tpd is the temperature of the photodetector;
Id0 is vertical intercept graph (that represents dark current at 0° C.); and
m represents slope of logarithmic current.

Figure 8:
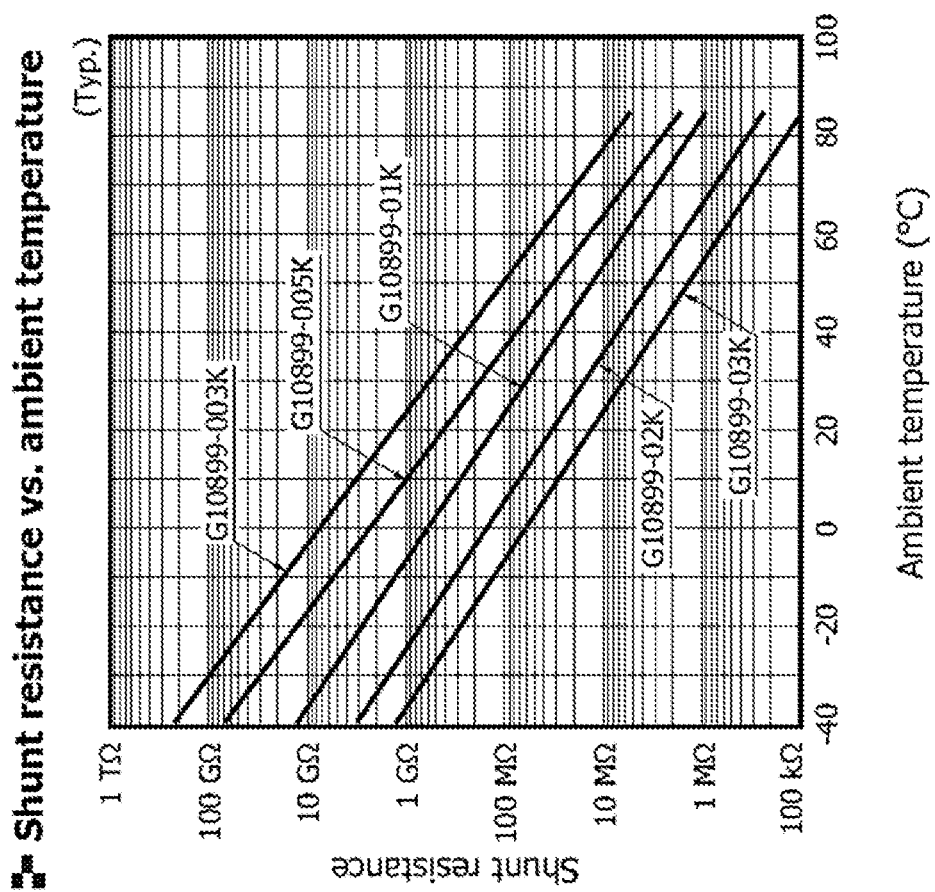
FIG. 8 is a graph showing the thermal law governing the shunt resistance.

This exponential expression is convenient, because often photodiode manufacture offer datasheet graphs of Rsh under log base 10 format as shown, e.g., in FIG. 8.
According to Equation 5:

$$Id0 = \frac{10(mV)}{Rsh0} \quad (12)$$

wherein Rsh0 is the shunt resistance at reference temperature 0° C. (graph vertical intercept in FIG. 8):
Similarly, the slope m can be calculated using graph values:

$$m = -\frac{\log(Rsh_{T2}) - \log(Rsh_{T1})}{T_2 - T_1} \quad (13)$$

The photodiode dark current is then found as:

$$Id = Id0 * 10^{m*Tpd} \quad (4)$$

and this thermal law is used in Equations 3a, 3b and 2a.
Slope m has proved to represent a reliable value for a given family of photodetectors. A photodetector family is defined by the type of semiconductor, its technology, the packaging and its diameter or surface area (see, e.g., FIG. 8 that shows an example of the shunt resistance as a function of the ambient temperature (extracted from Hamamatsu datasheet)).

Id0, which is specific to the individual photodetector, can be determined using the calibration procedure.

Calibration Method:

The following describes example implementations of the calibration method of FIG. 2, in accordance with specific embodiments. The following detailed calculation methods are provided as examples only and it will be understood that one skilled in the art can easily devise other calculation details that would equivalently derive all the necessary parameters associated with the photodetector and the amplification circuit of the optical power meter.

Calibration Method Example 1

In this example, optical power offset values A0, A1, B0, B1, C0, C1 and $A0_{bias}$ are read for more than two amplification gain settings, including low scale bias, low scale, high scale and high scale bias.

Table 1 shows values to be read as per this example:

TABLE 1

| Temperature sensors | | Amplification gain scales | | | |
|---|---|---|---|---|---|
| Tpd | Tgnd | Scale low bias | Scale low | Scale high | Scale high bias |
| Tpd0 | Tgnd0 | C0 | B0 | A0 | $A0_{bias}$ |
| Tpd1 | Tgnd1 | C1 | B1 | A1 | |

In Table 1, readings $A0_{bias}$, A0, B0 and C0 represent raw optical power values raw read at the first temperature point T0; readings A1, B1 and C1 represent raw optical power values raw read at the second temperature point T1; Tpd0 and Tgnd0 respectively represent temperature values read on the temperature sensor 22 and temperature sensor 24 at the first temperature point T0; and $T_{pd1}$ and $T_{gnd1}$ respectively represent temperature values read on the temperature sensor 22 and temperature sensor 24 at the second temperature point T1.

Then, the processor 18 or another external processor derives numerical model parameters associated with the photodetector 12 and the amplification circuit 14 of the optical power meter 11 to obtain a numerical representation of the optical power offset. This can be performed by solving equation 2 or 3 using the values read at the two temperature points.

For example, by applying Equation 2 to A0, B0, A1 and B1 we obtain:

$$0 = A0 - Kel_{high} * [Ib(Tgnd_0) + Id0 * 10^{m*Tpd_0}] - [Vo(Tgnd_0)] \quad (15)$$

$$0 = B0 - Kel_{low} * [Ib(Tgnd_0) + Id0 * 10^{m*Tpd_0}] - [Vo(Tgnd_0)] \quad (16)$$

$$0 = A1 - Kel_{high} * [Ib(Tgnd_1) + Id0 * 10^{m*Tpd_1}] - [Vo(Tgnd_1)] \quad (17)$$

$$0 = B1 - Kel_{low} * [Ib(Tgnd_1) + Id0 * 10^{m*Tpd_1}] - [Vo(Tgnd_1)] \quad (18)$$

By subtracting Equations 15 and 16, one obtains:

$$[Ib(Tgnd_0) + Id0 * 10^{m*Tpd_0}] = \frac{A0 - B0}{Kel_{high} - Kel_{low}} \quad (19)$$

Similarly, from Equations 17 and 18:

$$[Ib\,(Tgnd_1) + Id0*10^{m*Tpd_1}] = \frac{A1 - B1}{Kel_{high} - Kel_{low}} \quad (20)$$

In this embodiment, the transimpedance amplifier input bias Ib is assumed to be constant value or a linear function of temperature (the temperature drift being represented in A/° C.). Of course, other temperature-dependent behaviors (as can be verified in transimpedance amplifier datasheets) can be accounted for if necessary. In the case of a small temperature difference between T0 and T1 (e.g., less than about 2° C. in practice), the transimpedance amplifier input bias Ib can be assumed constant:

$$Ib(Tgnd_0) = Ib(Tgnd_1) \quad (21)$$

Then, by subtracting Equations 19 and 20, one obtains Id, which may be saved as one of the numerical representation parameters:

$$Id0 = \frac{\frac{A0 - B0 - A1 + B1}{Kel_{high} - Kel_{low}}}{10^{m*Tpd_0} - 10^{m*Tpd_1}} \quad (22)$$

Equation 19 substitution of Id gives Ib value:

$$Ib\,(Tgnd_0) = \frac{A0 - B0}{Kel_{high} - Kel_{low}} - \frac{\frac{A0 - B0 - A1 + B1}{Kel_{high} - Kel_{low}}}{10^{m*Tpd_0} - 10^{m*Tpd_1}} * 10^{m*Tpd_0} \quad (23)$$

From this value, values of Ib as a function of temperature $T_{gnd}$ can be retrieved, e.g., from the thermal law specifications provided in transimpedance amplifier datasheet. This value of Ib(Tgnd0) may be saved as one of the numerical representation parameters.

Assuming a linear thermal law for Vo:

$$Vo(Tgnd) = Vo(Tgnd_0) + \delta V*(Tgnd - Tgnd_0) \quad (24)$$

The amplification circuit offset Vo can be derived as:

$$Vo(Tgnd_0) = A0 - Kel_{high}*(Ib(Tgnd_0) + Id(Tpd_0)) \quad (25a)$$

or $$Vo(Tgnd_0) = B0 - Kel_{low}*(Ib(Tgnd_0) + Id(Tpd_0)) \quad (26b)$$

and $$\delta Vo = \frac{A1 - A0 - Kel_{high}*(Id(Tpd_1) - Id(Tpd_0))}{Tgnd_1 - Tgnd_0} \quad (26a)$$

or $$\delta Vo = \frac{B1 - B0 - Kel_{low}*(Id(Tpd_1) - Id(Tpd_0))}{Tgnd_1 - Tgnd_0} \quad (26b)$$

These values of Vo(Tgnd0) and Vo may be saved as numerical representation parameters.

Validations:

For more reliability, the derived value of Ib may also be validated against a typical value and/or minimum and maximum expected values, as can be found, e.g., in the transimpedance amplifier datasheet.

Similarly, the derived value of Id may be validated from the photodetector datasheet:

$$Id(Tpd_c) = Id0*10^{m*Tpd_c} \quad (27)$$

Moreover, as per photodiode manufacturers and optical industry definitions:

$$Id = \frac{10\,(mV)}{Rsh} \quad (5)$$

The shunt resistance value Rsh that can be derived from the value of Id should also satisfy the minimum shunt resistance value as obtained from the photodetector datasheet value (see FIG. 8).

$$Rsh(0°\,C.) = \frac{10\,(mV)}{Id_0} \quad (28)$$

Figure 9:
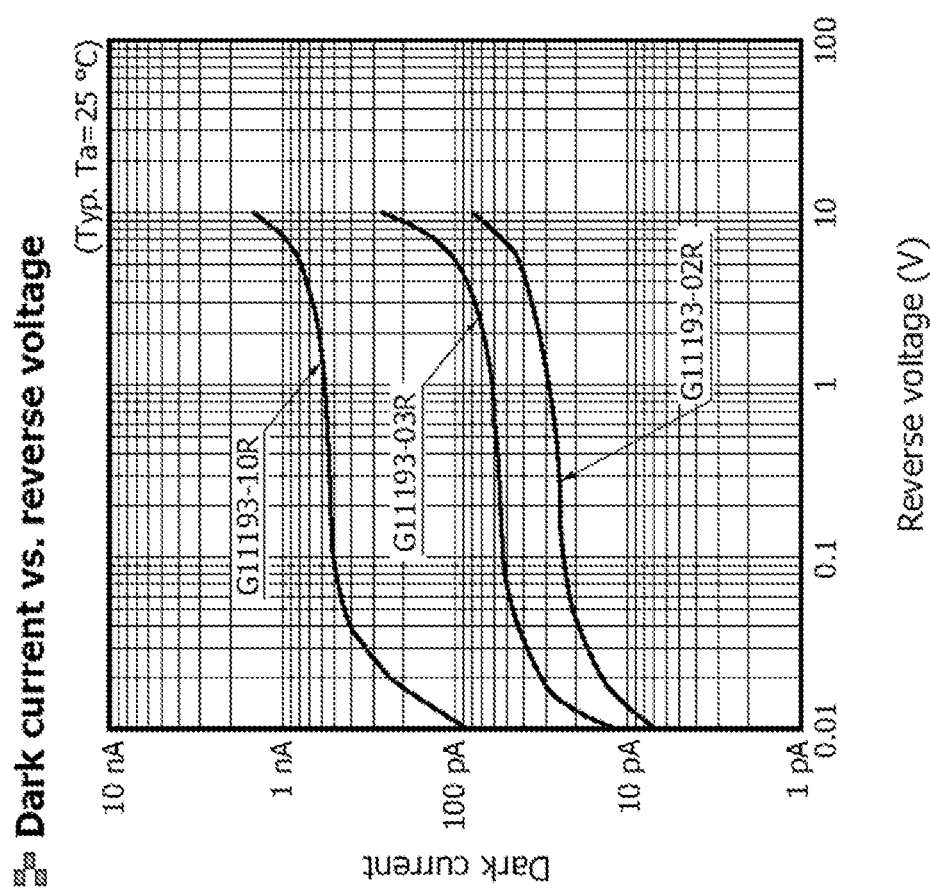
FIG. 9 is a graph showing the variation of the photodetector dark current with reverse voltage.

In one embodiment, the photodetector saturation current Is may be derived by applying Vbias on high gain scale (read $A0_{bias}$ value):

$$Is = \tau \frac{A0_{bias} - A0}{Kel_{high}} \quad (29)$$

wherein τ is the result of division between Is and Ibias corresponding to Vbias value, provided by photodetector manufacturers (see, e.g., FIG. 9 that shows an example of the dark current as a function of the reverse voltage (extracted from Hamamatsu datasheet)).

The voltage drop on the photodiode Vd may be calculated using Equation 6:

$$Vd = \frac{\eta k(273 + Tpd0)}{e} \ln\left(\frac{Id(Tpd0)}{Is} + 1\right) \quad (38)$$

From the electrical circuit of FIG. 2, input voltage at the transimpedence amplifier is derived:

$$Vio = Vd + \Delta Vs = Vd + Vs2 - Vs1 \quad (31)$$
$$= Vd + S*(Tgnd_1 - Tpd_1 - Tgnd_0 + Tpd_0)$$

wherein Vs2 and Vs1 are respectively Seebeck induced thermoelectric voltage in response to a temperature difference across photodetector terminals material, S is Seebeck absolute coefficient (tables generally provide the material coefficient relative to platinum, from which the Seebeck absolute coefficient can be derived). Seebeck voltage is the result of photodector assembling procedure (soldering, connector, mounting etc). For an ideal assembly, temperature drop across photodetector terminals is minimum and equal for both terminals that permit theoretical assumption ΔVs=0. Equation 31 represents the worst case where Vs1=0 and Vs2 is maximum. For gold, silver and copper Seebeck coefficient relative to platinum is 6.5 μV/K. The S for platinum itself is approximatively −5 μV/K at room temperature. That at room temperature we can apply S=1.5 μV/K for calculation (after the sign conventions means that the end with higher temperature has the lower voltage).

The last term of Equation 31 may provide a temperature calibration between two temperature sensors that are compared.

For validation, Vio should lie within a valid range of values for a given temperature, as can be derived from the transimpedance amplifier datasheet. If Vio is found not to be consistent with the transimpedance amplifier datasheet (not within a valid range of values) the follow alternative method may be used.

Calibration Method Example 2

In practical implementations, either one of the methods of example 1 and 2 can be used to derive the numerical representation parameters. In some embodiments, they can also be combined such that under some conditions, the calculations of example 1 are conducted, whereas under some other conditions, the calculations of example 2 are conducted. For example, the calculations of example 2 can be conducted if the absolute value derived value of the photodetector dark current Id is greater than the photodetector reverse bias saturation current Is (|Id|>Is). Otherwise, the calculations of example 1 are conducted.

In the following calculations, typical values are used for Vio and ΔVs, as can be derived respectively from the transimpedance amplifier datasheet and the photodetector datasheet.

The voltage drop on the photodiode Vd may then be derived as:

$$Vd = \max|Vio| + \Delta Vs \quad (32)$$

The photodiode dark current Id may be derived from Equation 6:

$$Td(Tpd0) = Is\left(\exp\frac{eVd}{\eta kTpd0} - 1\right) \quad (33)$$

and $$Id0 = \frac{Id(Tpd0)}{10^{m*Tpd0}} \quad (34)$$

This value of Id may be saved as one of the numerical representation parameters.

Values of Vo(Tgnd0) and Vo may be derived from Equations 25a, 25b, 26a and 26b hereinabove and be saved as numerical representation parameters.

The value of Ib(Tgnd0) may be derived from Equation 23 hereinabove and be saved as numerical representation parameters.

Optionally, a linear thermal law may be employed for Ib:

$$Ib(Tgnd) = Ib(Tgnd_0) + \delta Ib*(Tgnd - Tgnd_0) \quad (35)$$

and $$\delta Ib = \frac{\frac{A1 - B1 - A0 + B0}{Kel_{high} - Kel_{low}} - Id0*10^{m*(Tpd1-Tpd0)}}{Tgnd_1 - Tgnd_0} \quad (36)$$

If used, this value of δIb may also be saved as a numerical representation parameter.

In some embodiments, a reverse bias voltage Vbias may optionally be applied on the photodetector at the lowest amplification gain setting (low bias gain setting). In this case, the photodetector dark current Id0bias will be different from that without reverse bias voltage (as calculated hereinabove for the low and high scales). However, the slope m may be assumed to be the same.

In embodiments employing reverse bias voltage, the value of Id0bias may be derived as follows.

By applying Equation 2 to C0 and C1, we obtain:

$$0 = C0 - Kel_{low}*[Ib(Tgnd_c) + Id0*10^{m*Tpdc}] - [Vo(Tgnd_c)] \quad (37)$$

$$0 = C1 - Kel_{low}*[Ib(Tgnd_{wup}) + Id0*10^{m*Tpdwup}] - [Vo(Tgnd_{wup})] \quad (38)$$

By subtracting Equations 37 and 38 and assuming that Ib(Tgnd$_0$)=Ib (Tgnd$_1$):

$$Id0_{bias} = \frac{C0 - C1}{Kel_{low}*(10^{m*Tpd_0} - 10^{m*Tpd_1})} \quad (39)$$

This value may be used in Equation 2 or 2a in replacement of Id0 when calculating the optical power offset$_i$ and optical power values net$_i$ for the low bias gain setting. Other numerical representation parameters, i.e. Is, Vo and Vo, apply to all amplifier gain settings, including bias settings.

Similarly, this value of photodetector dark current Id0bias may be used if deriving the photodetector reverse bias saturation current Is under bias voltage:

$$Is = \tau*Id0_{bias}*10^{m*Tpd_0} \quad (40)$$

Technical benefits: improved linearity specification, improved nulling-free temperature range, reduced warmup time, improved thermal stability, possible automatic offset nulling and/or factory nulling.

Manufacturing benefits: may be used to perform complete characterization of each photodetector, transimpedance amplifier and assembled optical power meter; a statistical data base can be built therefrom, with timely updated information on parts quality; reduced warmup time and/or automated offset nulling decreases manufacturing time and thereby the manufacturing cost.

User benefit: shorter measurement time and improved measurement uncertainty over a broad range of temperature over which the optical power meter can operate.

Scientific (labs): improved measurement uncertainty.

In some embodiments, the proposed calibration procedure can be implemented in a post-acquisition processing so that it does not interfere with continuously acquisition sampling, which makes it suitable for high speed or protocol detection power meters.

The embodiments described above are intended to be exemplary only. The scope of the invention is therefore intended to be limited solely by the appended claims.

The invention claimed is:

1. An optical power measurement method comprising:
   at a measurement temperature point,
   reading a raw optical power value from an optical power meter comprising a photodetector and an amplification circuit;
   reading a measurement photodetector temperature value ($T_{pd}$) associated with the photodetector; and
   reading a measurement ground plane temperature value ($T_{gnd}$) associated with a ground plane of the amplification circuit;
   determining a measurement optical power offset value from predetermined parameters associated with the photodetector and the amplification circuit of the optical power meter, said measurement photodetector temperature value ($T_{pd}$) and said a measurement ground plane temperature value ($T_{gnd}$);

deriving an optical power measurement value from said raw optical power value and the determined measurement optical power offset value.

2. The optical power measurement method as claimed in claim 1, further comprising the prior steps of:
at a first temperature point:
reading a first photodetector temperature value ($T_{pd0}$) associated with the photodetector of the optical power meter; and
reading a first ground plane temperature value ($T_{gnd0}$) associated with the ground plane of the amplification circuit of the optical power meter;
for a first amplification gain setting and for a second amplification gain setting:
reading optical power offset values (A0, B0);
at a second temperature point different from the first temperature point:
reading a second photodetector temperature value ($T_{pd1}$) associated with the photodetector of the optical power meter; and
reading a second ground plane temperature value ($T_{gnd1}$) associated with the ground plane of the amplification circuit of the optical power meter;
for said first amplification gain setting and for said second amplification gain setting:
reading optical power offset values (A1, B1);
deriving said predetermined parameters associated with the photodetector and the amplification circuit of the optical power meter, from the read optical power offset values (A0, B0; A1, B1), photodetector temperature values ($T_{pd0}$, $T_{pd1}$) and ground plane temperature values ($T_{gnd0}$, $T_{gnd1}$).

3. The optical power measurement method as claimed in claim 1, wherein the predetermined parameters comprise: an input bias current of the amplification circuit, a dark current of the photodetector at a reference temperature, an amplification circuit offset as a function of the ground plane temperature.

4. The optical power measurement method as claimed in claim 2, wherein the measurement temperature point is different from both the first temperature point and the second temperature point.

5. The optical power measurement method as claimed in claim 2, wherein the raw optical power value is read using a measurement amplification gain setting that is different from both the first amplification gain setting and the second amplification gain setting.

6. A calibration method for characterizing an optical power offset of an optical power meter, the method comprising:
at a first temperature point:
reading a first photodetector temperature value ($T_{pd0}$) associated with a photodetector of the optical power meter; and
reading a first ground plane temperature value ($T_{gnd0}$) associated with a ground plane of the amplification circuit of the optical power meter;
for a first amplification gain setting and for a second amplification gain setting:
reading optical power offset values (A0, B0);
at a second temperature point different from the first temperature point:
reading a second photodetector temperature value ($T_{pd1}$) associated with a photodetector of the optical power meter; and
reading a second ground plane temperature value ($T_{gnd1}$) associated with a ground plane of the amplification circuit of the optical power meter;
for said first amplification gain setting and for said second amplification gain setting:
reading optical power offset values (A1, B1);
deriving parameters associated with the photodetector and the amplification circuit of the optical power meter, from the read photodetector temperature values ($T_{pd0}$, $T_{pd1}$), ground plane temperature values ($T_{gnd0}$, $T_{gnd1}$) and optical power offset values (A0, B0; A1, B1).

7. The calibration method as claimed in claim 6, further comprising:
at a measurement temperature point,
reading a measurement photodetector temperature value ($T_{pd}$) associated with a photodetector of the optical power meter; and
reading a measurement ground plane temperature value ($T_{gnd}$) associated with a ground plane of the amplification circuit of the optical power meter;
determining a measurement optical power offset value from said derived parameters, said measurement photodetector temperature value ($T_{pd}$) and said a measurement ground plane temperature value ($T_{gnd}$).

8. The calibration method as claimed in claim 7, further comprising:
at said measurement temperature point,
reading a raw optical power value;
deriving an optical power measurement value from said optical power value and the determined measurement optical power offset value.

9. The calibration method as claimed in claim 6, wherein the derived parameters comprise: an input bias current of the amplification circuit, a dark current of the photodetector at a reference temperature, an amplification circuit offset as a function of the ground plane temperature.

10. The calibration method as claimed in claim 7, wherein the measurement temperature point is different from both the first temperature point and the second temperature point.

11. The calibration method as claimed in claim 8, wherein the raw optical power value is read using a measurement amplification gain setting that is different from both the first amplification gain setting and the second amplification gain setting.

12. An optical power meter comprising:
a photodetector, an amplification circuit and an analog-to-digital converter for reading a raw optical power value;
a first temperature sensor associated with the photodetector for measuring a photodetector temperature value ($T_{pd}$);
a second temperature sensor associated with a ground plane of the amplification circuit for measuring a ground plane temperature value ($T_{gnd}$); and
a processing unit configured for:
determining a measurement optical power offset value from predetermined parameters associated with the photodetector and the amplification circuit, the photodetector temperature value ($T_{pd}$) and the ground plane temperature value ($T_{gnd}$); and
deriving an optical power measurement value from said raw optical power value and the determined measurement optical power offset value.

13. An optical power meter as claimed in claim 12, wherein said processing unit is further configured for:
receiving:

a first photodetector temperature value ($T_{pd0}$) associated with the photodetector of the optical power meter and read at a first temperature point;

a first ground plane temperature value ($T_{gnd0}$) associated with the ground plane of the amplification circuit of the optical power meter and read at the first temperature point;

optical power offset values (A0, B0) read for a first amplification gain setting and for a second amplification gain setting, at the first temperature point;

a second photodetector temperature value ($T_{pd1}$) associated with the photodetector of the optical power meter and read at a second temperature point;

a second ground plane temperature value ($T_{gnd1}$) associated with the ground plane of the amplification circuit of the optical power meter and read at the second temperature point; and optical power offset values (A1, B1) read for the first amplification gain setting and for the second amplification gain setting, at the second temperature point; and deriving said predetermined parameters associated with the photodetector and the amplification circuit of the optical power meter, from photodetector temperature values ($T_{pd0}$, $T_{pd1}$), ground plane temperature values ($T_{gnd0}$, $T_{gnd1}$) and optical power offset values (A0, B0; A1, B1).

14. The optical power meter as claimed in claim 12, wherein the predetermined parameters comprise: an input bias current of the amplification circuit, a dark current of the photodetector at a reference temperature, an amplification circuit offset as a function of the ground plane temperature.

15. The optical power meter as claimed in claim 14, wherein the measurement temperature point is different from both the first temperature point and the second temperature point.

16. The optical power meter as claimed in claim 14, wherein the raw optical power value is read using a measurement amplification gain setting that is different from both the first amplification gain setting and the second amplification gain setting.

* * * * *